United States Patent [19]

Leone, Sr.

[11] 4,246,779
[45] Jan. 27, 1981

[54] METHOD OF DETERMINING MOTORCYCLE POWER OUTPUT

[76] Inventor: Woodrow W. Leone, Sr., 3465 Kenwood Dr., Beaumont, Tex. 77706

[21] Appl. No.: 85,439

[22] Filed: Oct. 16, 1979

Related U.S. Application Data

[62] Division of Ser. No. 953,192, Oct. 17, 1978, Pat. No. 4,196,617.

[51] Int. Cl.³ .............................................. G01L 3/16
[52] U.S. Cl. ..................................................... 73/134
[58] Field of Search .......................... 73/117, 134, 135

[56] References Cited

U.S. PATENT DOCUMENTS

| | | | |
|---|---|---|---|
| 2,287,084 | 6/1942 | Bennett | 73/134 X |
| 3,733,894 | 5/1973 | Dahl | 73/117 |
| 3,940,978 | 3/1976 | Akkerman et al. | 73/117 |

FOREIGN PATENT DOCUMENTS 863469  1/1953  Fed. Rep. of Germany ............. 272/73

OTHER PUBLICATIONS

*Popular Science*, Mar. 1976, p. 81, "Bike-powered TV".

*Primary Examiner*—Charles A. Ruehl
*Attorney, Agent, or Firm*—Mason, Fenwick & Lawrence

[57] ABSTRACT

A motorcycle power take-off drive system is disclosed for driving a dynamometer from either a chain drive or a shaft drive motorcycle having either right or lefthand chain or shaft drive connections. A support housing is straddled by the rear frame elements of the motorcycle with a support shaft extending into the axle openings in the frame to support the frame. A drive shaft sleeve coaxially surrounds the support shaft and has either a sprocket for connection to the chain of a chain driven motorcycle attached to one end or an internally splined sleeve drivingly connectable to an externally splined output drive member of a shaft drive motorcycle. A low-friction chain connects the drive shaft sleeve to a power drive shaft drivingly connected to a dynamometer.

2 Claims, 7 Drawing Figures

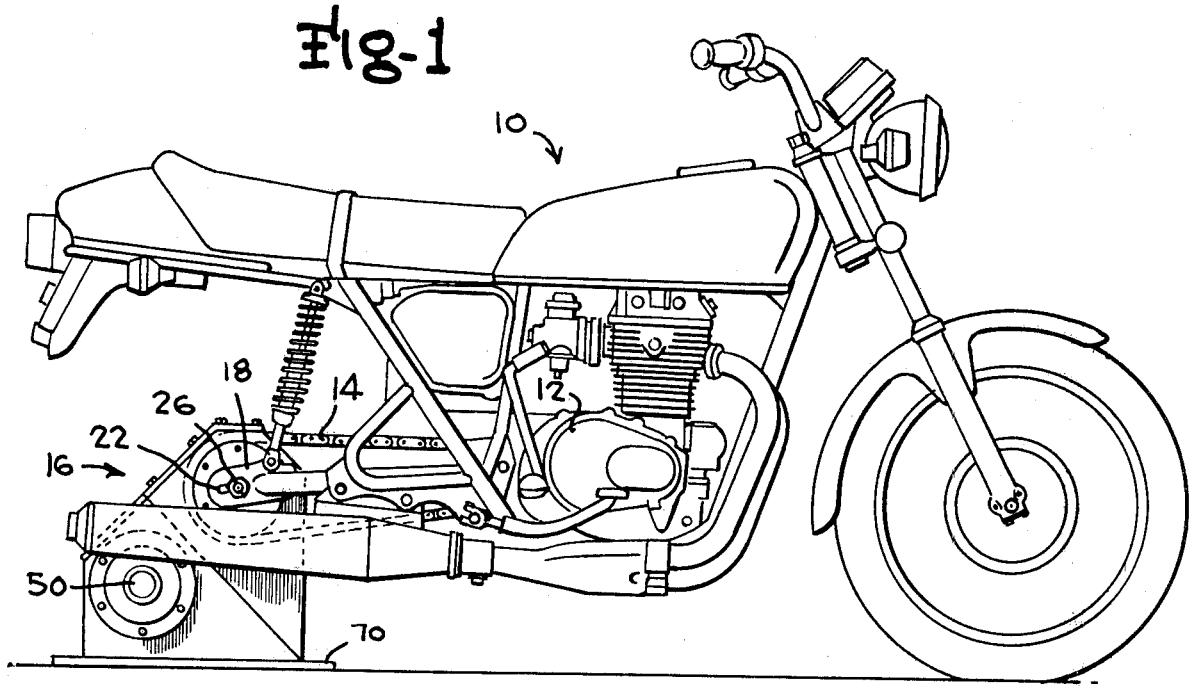
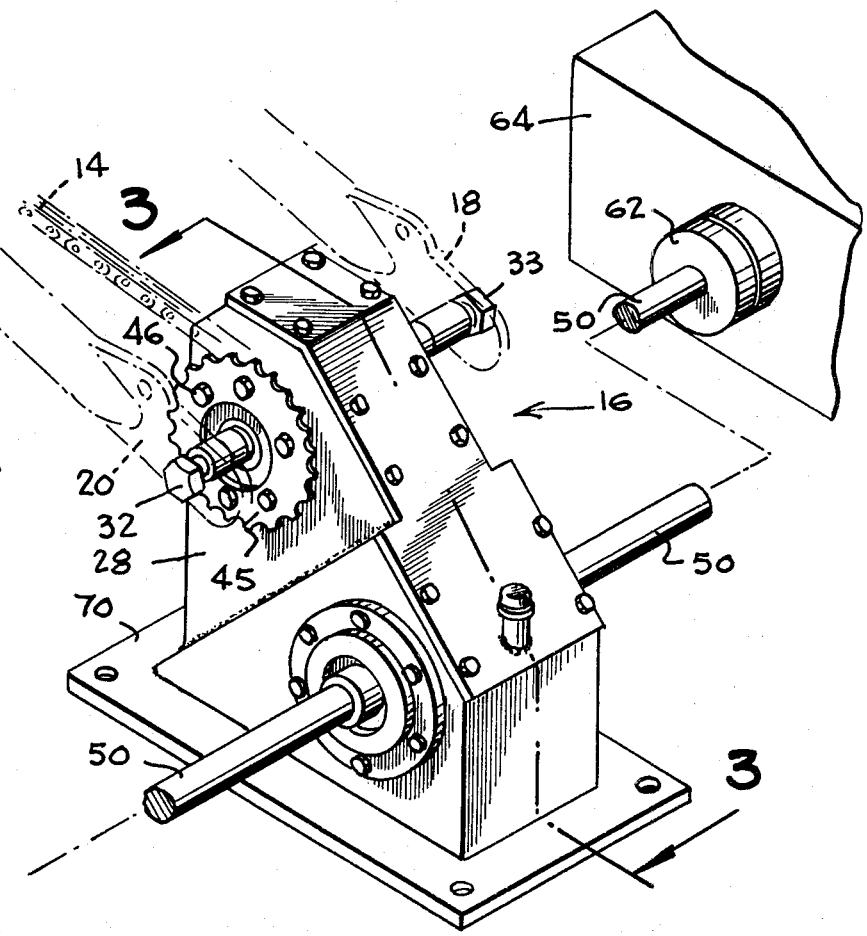

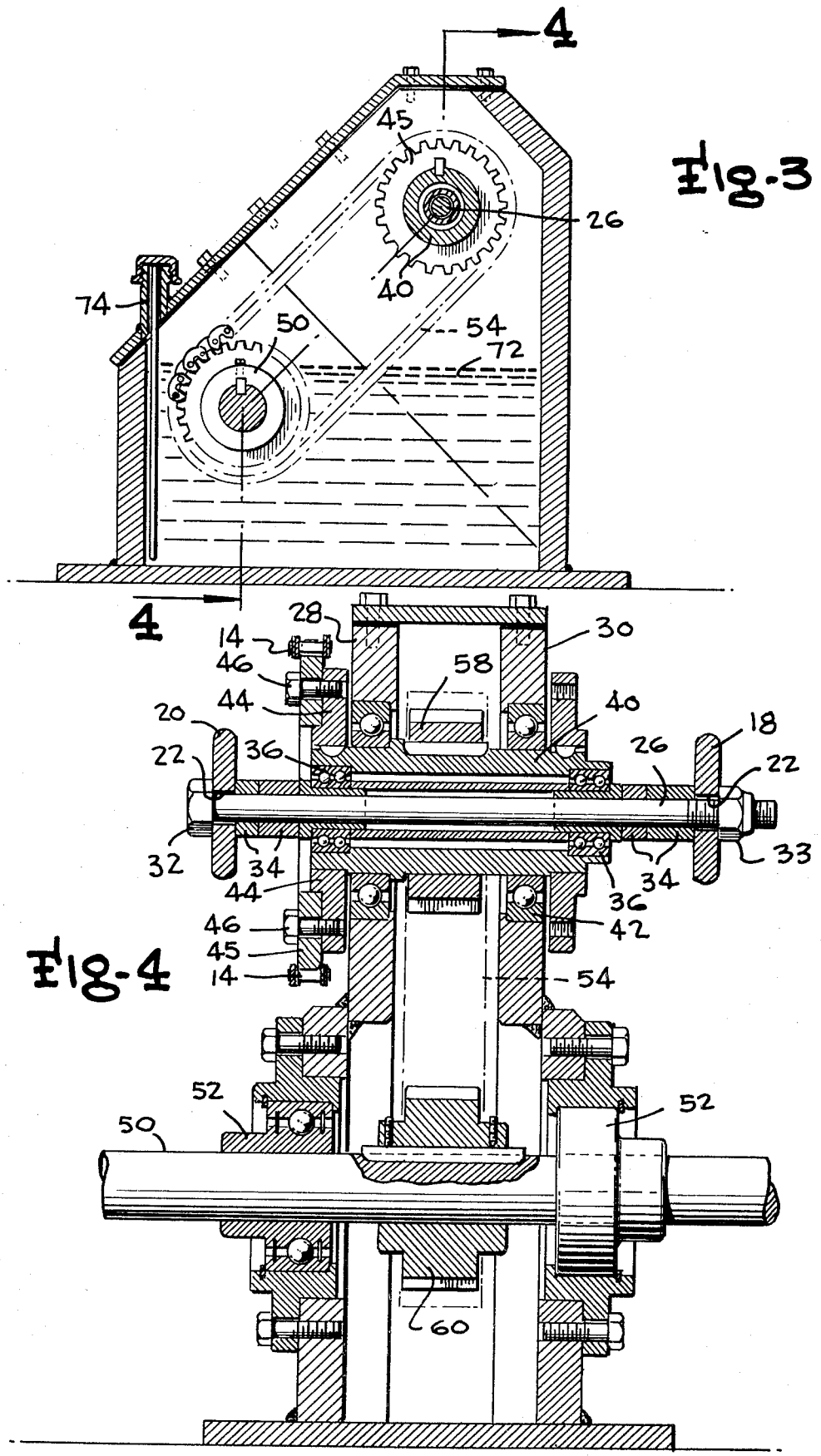

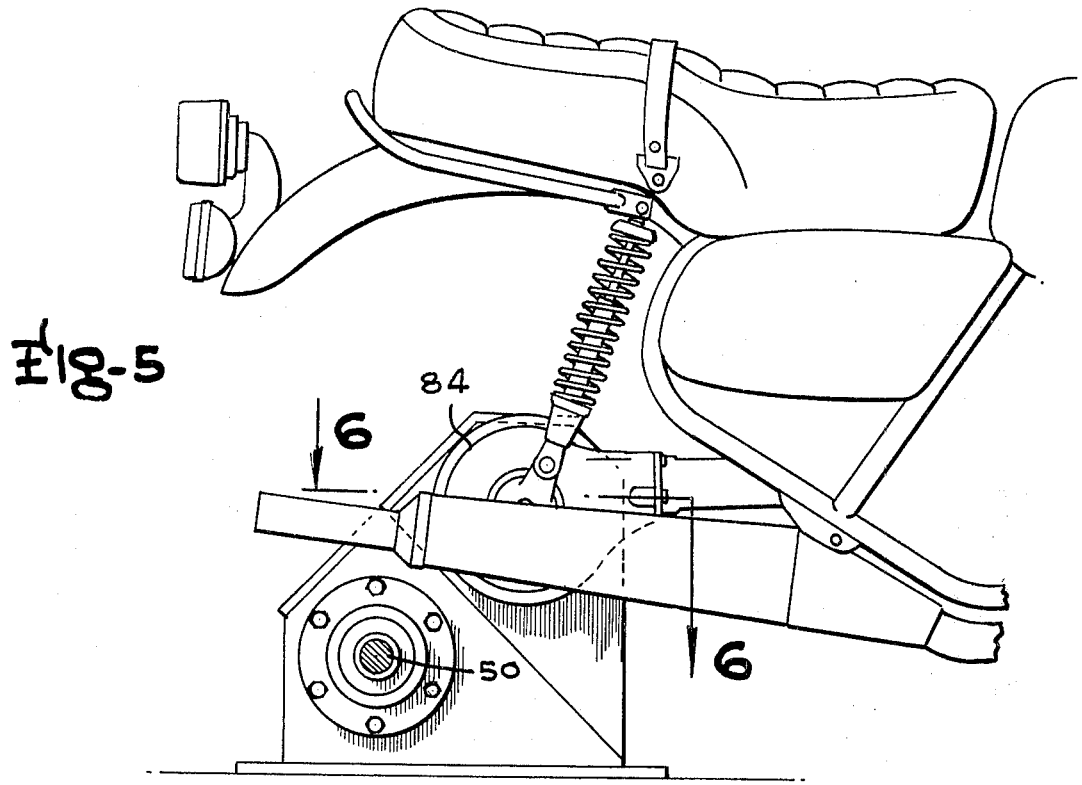
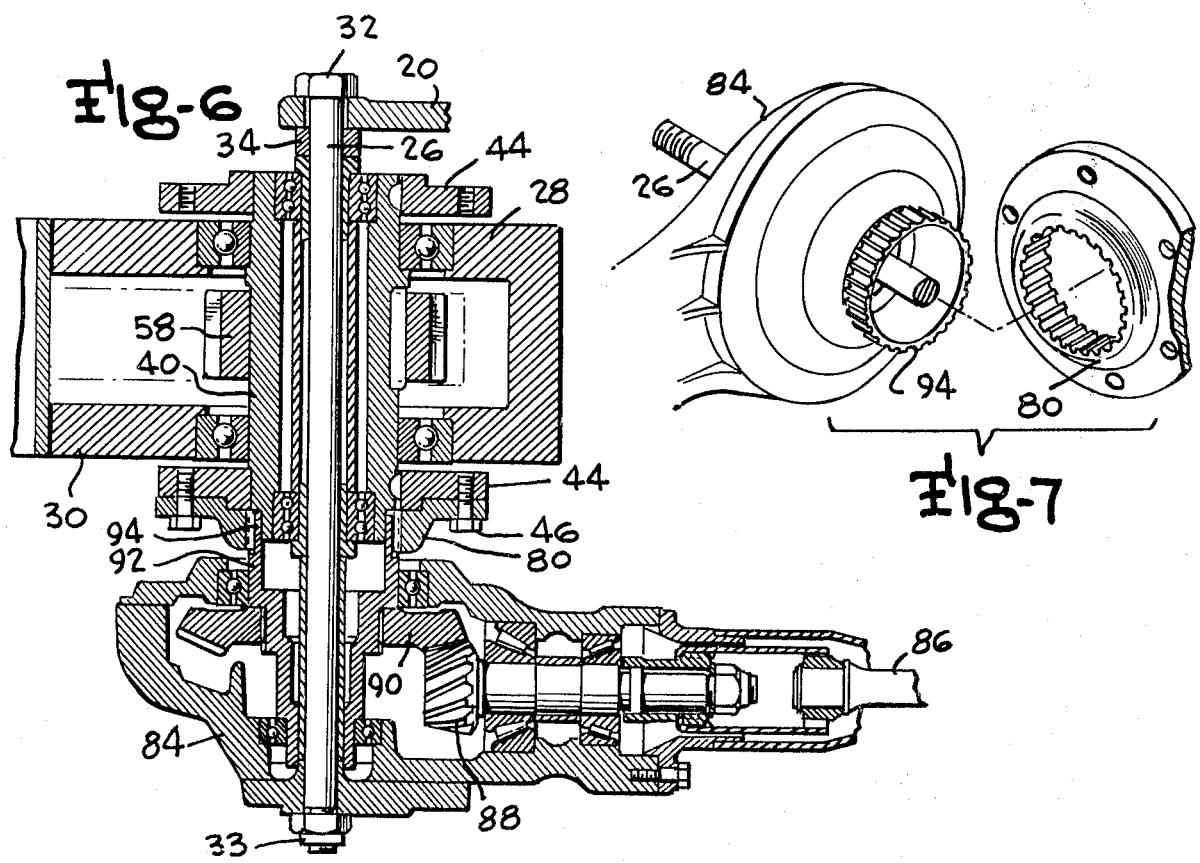

METHOD OF DETERMINING MOTORCYCLE POWER OUTPUT

This is a division of my copending Application Ser. No. 953,192 filed on Oct. 17, 1978, U.S. Pat. No. 4,196,617.

This invention is in the field of power test equipment and is more specifically directed to a unique power take-off apparatus for directly transmitting the power from a motorcycle engine to a driven device and which is of particular use in driving a dynamometer.

A problem common to practically all prior known motorcycle power takeoff devices is lack of versatility in that such devices have to be specially set up and frequently makeshift rigged in order to be used with different motorcycle designs.

Previously known devices have been employed for measuring the horsepower output of motorcycle engines; however, these devices have not provided satisfactory operation for a variety of reasons. More specifically, the prior known devices in many instances have failed to provide an accurate indication of the engine horsepower and have also been difficult and even dangerous to use. An additional problem is that many of the prior known devices requires several operators and cannot be used by a lone operator.

The primary deficiency of the conventional prior known dynamometer drive system for motorcycles of the type employing a pair of horizontal rollers on which the rear wheel of the motorcycle is positioned so that operation of the motorcycle effects rotation of the rollers is that such systems can only operate at low speed. Also, operation of the motorcycle results in a substantial forward force being applied to the motorcycle by the reaction between the tire and the supporting rollers and it is consequently necessary that the motorcycle be strongly and securely attached to restraining and support means. Any failure of the restraining and support means of the motorcycle would permit the motorcycle to spring clear of the dynamometer drive assembly to the great danger of those in the work area. Thusly, it is absolutely essential that the motorcycle be securely attached in position prior to the initiation of a test run and the wide variations in size, shape and construction of motorcycles creates substantial difficulty in providing test equipment capable of use with a wide variety of motorcycle types. Another shortcoming of drive systems of the foregoing type is that they cannot be used with knobby tires.

Additionally, the driving of a dynamometer in the foregoing manner by use of the rear wheel tire engagement with the supporting rollers does not always provide a good indication of engine horsepower due to varying frictional characteristics in the rear wheel bearing assembly, the particular type of tire employed on the wheel, and vibrations resultant from rotation of the wheel.

Thusly, the presently known motorcycle dynamometer drive systems have not provided satisfactory results in that they are difficult to use when testing a wide variety of motorcycle types, are sometimes quite dangerous to use and fail to provide accurate reliable results.

Other systems have employed long, cumbersome and dangerous chain drives for driving the dynamometer. Such systems can only be used with chain drive motorcycles and are consequently of limited value in view of the increasing number of shaft driven motorcycles.

Therefore, it is the primary object of this invention to provide a new and improved dynamometer drive system for use with motorcycles.

A further object of the invention is the provision of a new and improved motorcycle dynamometer drive system which is usable with a wide variety of motorcycle sizes and types.

Yet another object of the present invention is the provision of a new and improved motorcycle dynamometer test system which eliminates usage of the motorcycle rear wheel as part of the drive train for the dynamometer.

A further object is the provision of a power take-off for use with either a chain or shaft driven motorcycle.

Achievement of the foregoing objects is enabled by the preferred embodiment of the invention through the provision of a floor-mounted housing having a horizontal driven shaft sleeve mounted on bearings in the housing and extending transversely of the housing on opposite sides of the housing in a cantilever manner. A support shaft axially positioned in the housing with respect to the driven shaft sleeve extends into the openings in the rear frame portions of a motorcycle frame in which the motorcycle rear axle is normally positioned; such rear frame portions straddle the housing. The driven shaft sleeve is coaxial with the support shaft and can have a driven sprocket attached to one of its ends externally of the housing for receiving a drive chain extending from the output of the motorcycle transmission when the motorcycle is of the type having a chain drive. Alternatively, the driven shaft sleeve can be fitted with an internally splined drive connector dimensioned to matingly couple with the externally splined drive sleeve of a shaft drive type motorcycle normally received in the wheel of the motorcycle for driving same. In both cases, both the sprocket and the internally splined drive sleeve are removably connectable to the driven shaft sleeve by attachment bolts and are positioned with respect to the motorcycle in exactly the same position as the same items on the motorcycle rear wheel.

A power output shaft is also mounted in the housing and is connected to the driven shaft sleeve by a low-friction chain and is externally connected on the housing to a conventional dynamometer for driving the dynamometer upon operation of the motorcycle engine. Thusly, the subject invention permits the connection of either a shaft drive or a chain drive motorcycle to the dynamometer. Moreover, since the rear wheel of the motorcycle is removed, restraining and support means are not required for the motorcycle in that the connection of its rear frame for components to the support shaft provides a certain and sure support for the motorcycle without any danger of it breaking loose and becoming a hazard to those in the vicinity. The support shaft in effect takes the place of the rear axle of the motorcycle and constitutes the sole support for the rear end of the motorcycle; consequently, the system can be used with practically any type of motorcycle and special frames, jigs or the like for supporting the motorcycle is not required even for unusual motorcycle designs.

A better understanding of the manner in which the preferred embodiment achieves the foregoing objects of the invention will be enabled when the following written description is considered in conjunction with the appended drawings, in which:

FIG. 1 is a side elevation view of a chain-drive motorcycle drivingly connected to the drive system comprising the preferred embodiment;

FIG. 2 is a perspective view of the embodiment of FIG. 1;

FIG. 3 is a sectional view taken along lines 3—3 of FIG. 2;

FIG. 4 is a sectional view taken along lines 4—4 of FIG. 3;

FIG. 5 is a side elevation view illustrating the operation of the preferred embodiment with a shaft-drive motorcycle;

FIG. 6 is a sectional view taken along lines 6—6 of FIG. 5; and

FIG. 7 is an exploded perspective view of drive components of the embodiment of FIGS. 5 and 6.

Attention is initially invited to FIG. 1 of the drawings which illustrates a motorcycle of conventional chain-drive design having a transmission case 12 from which an output shaft (not shown) is provided. A sprocket on the output shaft is connected to the motorcycle drive chain 14 with the rear portion of the motorcycle being supported by the housing of the preferred embodiment of the invention which is generally 16. It will be observed that the rear wheel of the motorcycle is removed and that the rear frame elements 18 and 20 of the motorcycle straddle the housing and include openings 22 which normally receive the axle of the rear wheel of the motorcycle. However, a motorcycle frame support shaft means 26 mounted in main side plates 28 and 30 of the housing extends through the openings 22 in the frame and is held in position by a bolt head 32 on one end of the shaft and a tightening nut 33 on an opposite end in an obvious manner. Additionally, the support shaft also supports spacer sleeves 34 extending between bearing means 36 and the respective motorcycle frame elements 18 and 20 with the number and size of such sleeves depending upon the distance between the rear frame elements 18 and 20.

The bearings 36 provide a rotary connection between the support shaft 26 and a driven shaft sleeve member 40 which is supported for rotation by bearings 42 mounted in the side plates 28 and 30. Consequently, the driven shaft sleeve 40 is capable of rotation both with respect to the housing and the support shaft 26. A radial flange 44 is drivingly connected to the driven shaft sleeve 40 to form a unitary construction therewith and a sprocket is connected to the radial flange 44 by bolt members 46 as best shown in FIG. 4. The motorcycle drive chain 14 is fitted over the sprocket 45 so that driven movement of the chain 14 serves to rotate the sprocket 45, flange 44 and driven shaft sleeve 40 in an obvious manner.

A power drive shaft 50 mounted in bearings 52 in the casing side plates 28 and 30 is drivingly connected by a low-friction chain 54 mounted on a sprocket 58 drivingly connected to the drive shaft sleeve 40 internally of the housing and a sprocket 60 keyed to the power drive shaft 50. The low-friction chain 54 is a Morse HI-VO chain of extremely high power transmission efficiency. Lubrication of the low-friction chain 54 is provided by a sump 72 which is maintained at a proper level through a fill tube 74 as shown in FIG. 3.

Power drive shaft 50 is connected by a coupling 62 to a conventional dynamometer 64 as shown in FIG. 2. While the preferred embodiment illustrates the system in use for driving the dynamometer 64, it should be understood that the inventive drive system can also be used for driving other apparatus such as generators, pumps or the like if desired. A stable support for the rear portion of the motorcycle is provided by virtue of the fact that the housing includes a lower base plate 70 of sufficient dimensions to provide substantial lateral stability. Another point of significance is the fact that the radial flange 44 and associated sprocket 45 can be mounted on either side of the housing for accommodating motorcycles having the drive chain on either the right or left side of the motorcycle frame.

Turning now to FIGS. 5 through 7, it is noted that these figures are directed to the use of the subject invention for receiving power from a shaft-drive motorcycle. It will be observed that the only difference from the device of the first embodiment is that an internally splined sleeve 80, which is best illustrated in FIG. 7, is connected by bolt means 46 to the radial flange 44 in place of the sprocket means 45 of the first embodiment. FIG. 6 illustrates the manner of connection with the frame of the shaft-driven motorcycle in which the left-hand frame element 20 is engaged with the head 32 of shaft 26 which provides support for the frame. The other end of the shaft 26 extends through the housing 84 of the rear wheel driving mechanism of the motorcycle which includes a drive shaft 86 from the output of the motorcycle transmission drivingly connected to a pinion 88 meshing with a ring gear 90 which is keyed on a ring gear spacer 92 mounted for rotation in the housing and having an externally splined end portion male sleeve 94. The splines on the externally splined male sleeve 94 mesh with the internal splines of the internally splined female sleeve 80 so that when the parts are positioned as shown in FIG. 6, the internally splined sleeve 80 is driven via the elements 86, 88, 90, 92 and 94 in an obvious manner. It should be observed that the support shaft 26 extends through the area of the housing 84 normally occupied by the rear axle of the motorcycle.

Thusly, both embodiments of the invention permit a motorcycle to be connected to the system without any need for removing saddlebags, exhaust pipes or the like with the system being connectable to practically any type of motorcycle both right and lefthand drive which can either be of the chain or shaft type.

Numerous modifications of the subject invention will undoubtedly occur those of skill in the art and it should be understood that the spirit and scope of the invention is to be limited solely by the appended claims.

I claim:

1. A method of determining the power output of a motorcycle engine of a chain-drive motorcyle comprising the steps of:
    removing the rear wheel from the motorcycle to be tested;
    connecting the axle receiving openings of the motorcycle frame to a fixedly positioned support shaft;
    connecting the motorcycle chain to input drive means drivingly connected to a dynamometer; and
    operating the motorcycle engine to determine the power output thereof.

2. A method of determining the power output of a motorcycle engine of a shaft-drive motorcycle having an externally splined drive sleeve normally drivingly connected to the rear wheel of the motorcycle, said method comprising the steps of:
    removing the rear wheel from the motorcycle;
    connecting the axle receiving openings of the motorcycle frame to a fixedly positioned support shaft;
    matingly connecting the externally splined drive sleeve to an internally splined drive sleeve drivingly connected to a dynamometer; and
    operating the motorcycle engine to determine the power output thereof.

* * * * *